United States Patent
Meyer et al.

(10) Patent No.: US 10,411,821 B2
(45) Date of Patent: Sep. 10, 2019

(54) TRANSMISSION METHOD

(71) Applicant: Alcatel Lucent, Boulogne Billancourt (FR)

(72) Inventors: Gerhard Meyer, Nuremberg (DE); Jurgen Rahn, Nuremberg (DE)

(73) Assignee: Alcatel Lucent, Boulogne-Billancourt (FR)

( * ) Notice: Subject to any disclaimer, the term of this patent is extended or adjusted under 35 U.S.C. 154(b) by 156 days.

(21) Appl. No.: 15/550,055

(22) PCT Filed: Feb. 17, 2016

(86) PCT No.: PCT/EP2016/053298
§ 371 (c)(1),
(2) Date: Aug. 10, 2017

(87) PCT Pub. No.: WO2016/142134
PCT Pub. Date: Sep. 15, 2016

(65) Prior Publication Data
US 2018/0013509 A1    Jan. 11, 2018

(30) Foreign Application Priority Data
Mar. 6, 2015  (EP) ................................. 15290062

(51) Int. Cl.
*H04L 12/26* (2006.01)
*H04J 3/16* (2006.01)
(Continued)

(52) U.S. Cl.
CPC ............ *H04J 3/1652* (2013.01); *H04B 10/27* (2013.01); *H04J 3/07* (2013.01); *H04L 7/0075* (2013.01); *H04B 10/50* (2013.01); *H04B 10/61* (2013.01)

(58) Field of Classification Search
None
See application file for complete search history.

(56) References Cited

U.S. PATENT DOCUMENTS

| 6,535,567 B1 | 3/2003 | Girardeau, Jr. |
| 2009/0162061 A1* | 6/2009 | Kisaka ...................... H04J 3/07 398/52 |

(Continued)

FOREIGN PATENT DOCUMENTS

| CN | 101291179 | 10/2008 |
| CN | 101325465 | 12/2008 |

(Continued)

OTHER PUBLICATIONS

International Telecommunication Union; The Control of Jitter and Wander within the Optical Transport Network (OTN); G.8251 (09/10); ITU-T International Telecommunication Union, Geneva; CH, No. G.8251 (09/10); Sep. 22, 2010; pp. 1-124; XP017467620.

(Continued)

*Primary Examiner* — Anh Vu H Ly
(74) *Attorney, Agent, or Firm* — McCracken & Gillen LLC

(57) ABSTRACT

A technique is provided for transmitting client data included in a client signal via an optical transmission path of an optical transport network. The optical transport network uses transport frames include a transport frame period for transmitting client data. The method includes receiving multiple client entities comprising multiple client data bits; determining the number of client data entities received during a transport frame period to establish a mean number of client data entities to be included in a transport frame, the mean number of client data entities corresponding to a mean number of client data bits; mapping multiple client data entities into the transport frame wherein mapping comprises alternately adding and subtracting an amount of client data bits to/from the mean number of client data bits for at least two consecutive transport frames; and transmitting the trans- (Continued)

port frames comprising the client data via the optical transport network.

16 Claims, 5 Drawing Sheets

(51) Int. Cl.
*H04J 3/07* (2006.01)
*H04B 10/27* (2013.01)
*H04L 7/00* (2006.01)
*H04B 10/50* (2013.01)
*H04B 10/61* (2013.01)

(56) References Cited

U.S. PATENT DOCUMENTS

| | | | |
|---|---|---|---|
| 2011/0135304 A1* | 6/2011 | Katagiri | H04J 3/07 |
| | | | 398/45 |
| 2011/0170864 A1* | 7/2011 | Tani | H04J 3/1652 |
| | | | 398/43 |
| 2012/0008949 A1 | 1/2012 | Takahashi et al. | |
| 2012/0039609 A1 | 2/2012 | Dong et al. | |
| 2012/0213508 A1* | 8/2012 | Moynihan | H04J 3/0682 |
| | | | 398/25 |
| 2012/0269511 A1* | 10/2012 | Calderon | H04J 3/1664 |
| | | | 398/58 |
| 2013/0058643 A1 | 3/2013 | Honma et al. | |
| 2013/0071117 A1* | 3/2013 | Pan | H04J 3/12 |
| | | | 398/45 |
| 2013/0259481 A1* | 10/2013 | Suzuki | H04J 14/0227 |
| | | | 398/66 |
| 2015/0288538 A1* | 10/2015 | Fritschi | H04J 3/07 |
| | | | 398/66 |
| 2016/0056886 A1* | 2/2016 | Kitamura | H04L 47/745 |
| | | | 398/5 |

FOREIGN PATENT DOCUMENTS

| | | |
|---|---|---|
| CN | 103299562 | 9/2013 |
| EP | 2651056 | 10/2013 |
| JP | H07135465 | 5/1995 |
| JP | 2006332964 | 12/2006 |
| JP | 2011120141 | 6/2011 |

OTHER PUBLICATIONS

Office Action in related Chinese Application No. 201680013165.X dated May 17, 2019, 5 pages including English translation.

* cited by examiner

TRANSMISSION METHOD

TECHNICAL FIELD

The present document relates to a method for transmitting data in an optical transport network (OTN). In particular, the present document relates to a method for avoiding excessive short term wander in case of synchronous OTN by dithering OTN clock.

BACKGROUND

The OTN standard according to ITU-T was architected and specified as an asynchronous optical transport standard with +/−20 ppm clock tolerance. At the point in time were the standard was created there was no need seen to use the OTU/ODU trails and paths as direct server for reference clock transport, i.e. to synchronize the OTUk/ODUk signals to a primary reference clock (PRC) or a synchronization supply unit (SSU). Extensive studies investigating the capability of transparently transporting synchronized services as SDH or synchronous Ethernet have been carried out during the development of ITU-T G.8251 Recommendation and have shown that the transport on base of the +/−20 ppm free running ODUk/OTUk sever clock presents good means for the OTN mapping and multiplexing to comply to the requirements defined for the synchronized services in terms of wander and jitter generation at OTN network element (NE) client ports. All this was based on statistically distributed free run OTN transport or HO-ODU (higher order optical-channel data unit) clocks in the +/−20 ppm window. Some influence of the used OTN clock tolerance on the short term wander/low frequency jitter generation due to multiplexing and mapping has been observed during those studies (what is also documented in G.8251 Appendix text).

At the present time, an enhancement in ITU-T is in discussion called SyncO—synchronous OTN—which shall allow to transport a reference clock along an OTU link. Another discussion is to transport PTP (IEEE 1588v2) over OTN.

When synchronizing the OTN transport or HO-ODU clocks, problems may arise when the frequencies of synchronous services transported in the ODU payload or LO-ODUs (lower order optical-channel data unit) multiplexed into HO-ODU payload area will be near to integer fractions of the transport rates. This leads to systematic justification patterns with mostly stable justification states and with few infrequent extra frequency justification actions for infrequent phase adjustments. This happens for both mapping-schemes used for such client configurations, i.e. for asynchronous mapping procedure (AMP) as well as generic mapping procedure (GMP).

US Patent Application US 2012/0039609 A1 discloses a method and an apparatus for transporting client signals in an OTN. In one embodiment, the method includes: receiving a client signal; determining a quantity of n-bit data units of the client signal based on a clock of the client signal and a local clock; mapping the quantity of n-bit data units of the client signal to an overhead of a first Optical Channel Data Tributary Unit (ODTU) frame; mapping the n-bit data units of the client signal to a payload area of a second ODTU frame next to the first ODTU frame according to the quantity of n-bit data units mapped in the overhead of the first ODTU frame; mapping each n-bit data unit of the second ODTU frame to an Optical Channel Payload Unit-k Tributary Slot in an OPUk frame; and forming an Optical Channel Transport Unit-k frame including the OPUk frame for transmission.

US Patent Application US 2013/0058643 A1 discloses a data amount derivation apparatus. The data amount derivation apparatus includes: a first calculator configured to derive, for one series of parallelized mapping signals, amount of data in each frame period for a frame into which the parallelized mapping signals are mapped; and a second calculator configured to sum up amounts of data in N frame periods, where N is an integer, and to derive the resulting summation value as the amount of data to be mapped into the frame, each of the amounts of data in each of the frame periods being derived by the first calculator.

So, there is a need to improve the transmission of synchronous data, specifically reference clock signals in an optical transport network with regards to short term wander and low frequency jitter generation.

SUMMARY

In a broad aspect, the present document suggests to create dithering of justification events during the mapping of client signals carrying a reference clock signal for OTN mappings, e.g. by alternating adding and subtracting a number of bits, e.g. m/2-bit (see below). The client signal may be, for example, a LO-ODU signal. This creates regular plus/minus client or LO-ODU data phase shifts and a buffer fill reference variation that will increase the probability of justification events being reflected in the rate of the client or LO-ODU data that is de-mapped after the transmission over the OTN path with phase oscillations of the frequency of the client signal phase in relation to the server clock. The phase oscillation can then be filtered by the client or LO-ODU clock recovery process and the recovery process can average the client or LO-ODU phase to the average phase relation. In addition, the buffer sizes may be increased by 2×m-bits. This method avoids infrequent relative few phase steps that will generate low frequency jitter or short term wander passing the clock recovery filter.

According to a first aspect, a method for transmitting client data (in the following also referred to as LO-ODU data) included in a client signal (in the following also referred to as LO-ODU signal) via an optical transmission path of an optical transport network is provided. The optical transport network uses transport frames (in the following also referred to as HO-ODU frames) for transmitting client data, said transport frames having a certain transport frame period (in the following also referred to as HO-ODU frame period). The method comprises the following steps:

First, client data are received during a transport frame period. For example, the client signal may be or may include a reference clock signal which should be transported along the OTN link. According to another embodiment, a precision time protocol should be transported over OTN. The client signal may be received at a respective interface of a network element included in the OTN. The client signal may comprise multiple client entities.

In the following, the number of client data entities (in the following also referred to as LO-ODU data entities) comprising multiple client data bits (in the following also referred to as LO-ODU data bits) are determined which are received during a transport frame period. Thereby, a mean number of client data entities to be included in a transport frame is established, said mean number of client data entities corresponding to a mean number of client data bits. In other words, it is determined how many client data entities (which have to be transported over the OTN) are received during a single transport frame period. Said client data entities may be blocks of client data bits. Thus, the mean number of client data bits corresponds to a mean number of client data bits which are included in said mean number of client data entities. For example, a is the mean number of client data entities, each client data entity comprising b bits. Thus, the mean number of client data bits is the product of a and b (a*b).

After determining said mean number of client data entities, multiple client data entities are mapped into the transport frame. While mapping the client data into the transport frame, the amount of client data to be transmitted in consecutive transport frames is varied by adding or subtracting an amount of client data bits to/from said mean number of client data bits. In other words, the mapping step comprises alternately adding and subtracting an amount of client data bits to/from said mean number of client data bits for at least two consecutive transport frames. In yet other words, an artificial variation of data rate is created between subsequent transport frames by including a different number of client data entities in subsequent transport frames, i.e. by adding a certain amount of client data bits to the mean number of client data bits or subtracting a certain amount of client data bits from the mean number of client data bits.

Finally, the transport frames comprising said client data are transmitted via the optical transport network.

Said method is advantageous because due to the frequent variation of data rate, phase oscillations of the client signal phase are generated which can be easily filtered out by the client clock recovery process at the receiver side. The client clock recovery process will average the client phase to the average and infrequent, few phase steps are avoided that will generate low frequency jitter or short term wander which may pass the clock recovery filter.

According to embodiments, the client data to be included in consecutive transport frames is changed by adding/subtracting a fixed number of client data bits to/from said mean number of client data bits. In other words, the amount of client data included in a transport frame is changed in a deterministic way. For example, the fixed number of client data bits may be m/2, wherein m is the number of bytes included in a data block to be transmitted in a certain transport frame or transport multiframe. As an example, for 100G Ethernet mapping into OPU4 (OPU: optical payload unit), the value of m is 640 (mapping granularity of integer multiples of 640 bits/80 bytes) while for Gigabit Ethernet mapped with timing transparent transcoding (TTT) into OPU0 by using generic mapping procedure (GMP) m is 8 what means that a mapping granularity of integer multiples of one byte is used for those clients. Using a fixed number of client bits by means of which the data rate is varied is advantageous because the data rate varies around the mean number of client bits which have to be included in the transport frame in order to avoid an overflow/underrun of a buffer which is buffering the client data before transmitting. In addition, by using a fixed number of client bits for varying the data rate is advantageous because due to the averaging effect of the clock recovery process at the receiver side, the client clock is automatically averaged to its original clock rate.

According to embodiments, the number of client data bits mapped into consecutive transport frames is periodically changed. For example, the amount of client data included in a first transport frame is increased by adding a certain amount of client data bits to the mean number of client data bits. The amount of client data included in a second transport frame (directly following the first transport frame) is decreased by subtracting a certain amount of client data bits from said mean number of client data bits. A third transport frame (directly following the second transport frame) may again comprise an increased number of client data bits (with respect to the mean number of client data bits) and so forth. In other words, the periodicity of the client signal variation may be two times the frame period of the transport frame. Also other periodicity values may be possible. Thereby, an improved clock recovery processing may be possible.

According to embodiments, the mapping of client data entities is performed such that the number of client data bits to be included in a transport frame is permanently varied. Permanently varying in the present context means that all pairs of consecutive transport frames transmitted via the OTN comprise a different amount of client bits. Thereby, the clock recovery process is further improved.

According to embodiments, the number of client data bits mapped into consecutive transport frames is changed in a non-deterministic, stochastic way. For example, the number of client data to be included in subsequent transport frames may be varied based on a stochastic process. According to an embodiment, said stochastic process may be adapted to ensure that on average (over a large number of transport frames to be transmitted), the transmitted number of client data bits is equal or essentially equal to the mean number of client data bits to be transmitted for avoiding a buffer overflow/underrun.

According to embodiments, the mean number of client data entities to be included in a transport frame is determined based on the clock rate of the client signal, the transport frame period and the number of client data bits included in a transport frame. Said parameters define the client data rate (data rate of the client signal to be transmitted via OTN) and the data rate provided by means of the transport frames, i.e. the data rate based on which a mapping into the transport frames of the OTN hierarchy is possible.

According to embodiments, the client data are buffered within a buffer before mapping the client data into the transport frame. Said buffer enables a temporarily storing of the client data before mapping the client data into said transport frames. In order to avoid an overrun/underflow of the buffer due to the variation of data rate during the mapping process, the size of the buffer may be increased.

According to embodiments, the client data are continuously written into the buffer and read out of client data out of the buffer is controlled based on the determined mean number of client data entities. So, in other words, the determined mean number of client data entities is used as a measure for the filling level of the buffer and the mapping of client data into said transport frames is controlled based on said measure.

According to an embodiment, the mean number of client data entities is varied in order to vary the read out of client data out of the buffer. In other words, the measure indicating the filling level of the buffer is adjusted in order to influence the read out of the buffer and thereby vary the amount of client data to be mapped into the transport frames.

According to an embodiment, the varied number of client data entities is inserted in an overhead section of the transport frame. Thereby, information regarding the amount of client data included in a respective transport frame is transmitted via the OTN in order to provide said information to the receiver side and enable a client clock recovery based on said information.

According to an embodiment, at the receiver side, the client data included in the transport frame are buffered within a buffer. In other words, the payload data included in the transport frame (said payload data including the client data) are temporarily stored in order to be able to restore the client signal (comprising a certain client clock).

According to an embodiment, the varied number of client data entities is extracted out of the overhead section of the transport frame in order to control the readout of data out of the buffer at the receiver side. Said varied number of client data entities may be used in a clock recovery process for recovering the client signal, specifically the clock of the client signal. After clock recovery, the client signal is provided by reading client data out of the buffer based on the recovered client clock.

According to a further aspect, an optical transmitter for transmitting client data included in a client signal via an optical transmission path of an optical transport network is provided. The optical transport network uses transport frames comprising a transport frame period for transmitting said client data. The optical transmitter comprises:
- an interface for receiving the client data;
- a processing entity being adapted to determine the number of client data entities comprising multiple client data bits received during a transport frame period in order to establish a mean number of client data entities to be included in a transport frame, said mean number of client data entities comprising a mean number of client data bits;
- a mapping entity being adapted to map multiple client data entities into the transport frame, wherein the mapping entity is further adapted to vary the amount of client data to be transmitted in consecutive transport frames by adding or subtracting an amount of client data bits to/from said mean number of client data bits;
- an optical transmission entity being adapted to transmit an optical signal comprising transport frames including said client data via the optical transport network.

According to a third aspect, an optical receiver for receiving an optical signal of an optical transmission path of an optical transport network is provided. The optical transport network uses transport frames for transmitting client data. The receiver is adapted to provide client data and a client clock signal, the optical receiver comprising:
- an interface for receiving the optical signal;
- a processing entity being adapted extract a data entity indicator out of an overhead section of the transport frame, said data entity indicator specifying the amount of data entities included in the transport frame, wherein the value of the data entity indicator associated with consecutive transport frames continuously changes;
- a buffer being adapted to buffer data included in the optical signal;
- a control entity being adapted to receive the extracted data entity indicator and being adapted to control the readout of client data out of the buffer based on the continuously changing data entity indicator; and
- a clock recovery unit being adapted to provide the client clock signal based on the continuously changing value of the data entity indicator.

Finally, a method for receiving an optical signal of an optical transmission path of an optical transport network is disclosed. The optical transport network uses transport frames for transmitting client data. The method comprises the steps of:
- receiving the optical signal;
- extracting a data entity indicator out of an overhead section of the transport frame, said data entity indicator specifying an amount of data entities included in the transport frame, wherein a value of the data entity indicator associated with consecutive transport frames continuously changes;
- buffering client data included in the optical signal;
- receiving the extracted data entity indicator at a control entity and controlling a readout of client data out of the buffer based on the continuously changing data entity indicator; and
- recovering a client clock signal based on the continuously changing value of the data entity indicator.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner. Further, if not explicitly indicated otherwise, embodiments of the invention can be freely combined with each other.

BRIEF DESCRIPTION OF THE DRAWINGS

The invention is explained below in an exemplary manner with reference to the accompanying drawings, wherein.

DETAILED DESCRIPTION

Figure 1:
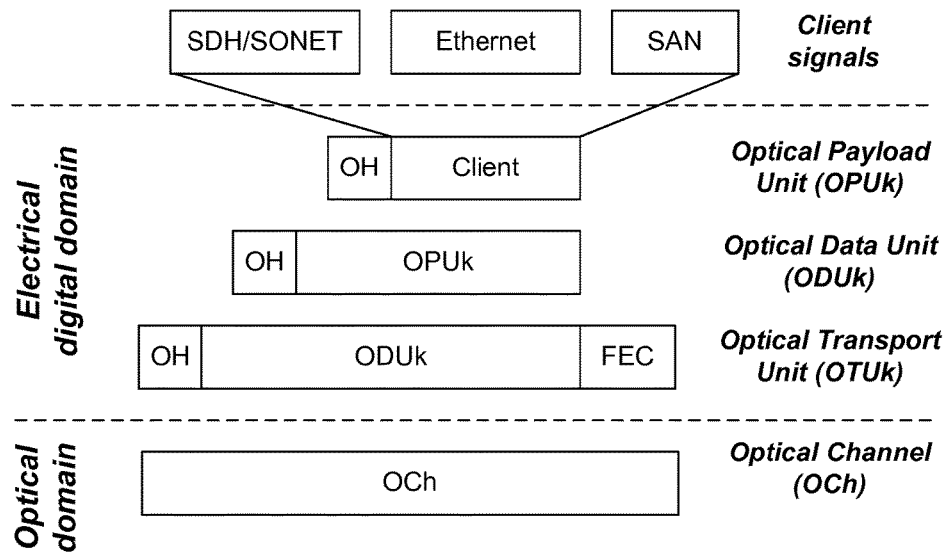
FIG. 1 illustrates the multi-layer architecture of an optical transport network according to ITU-T G.709.

FIG. 1 schematically illustrates the multi-layer architecture of an optical transport network according to ITU-T G.709. In the electrical digital domain of the OTN structure, the basic frame structure is based on an optical transport unit (OTUk) of size k, wherein k may be 1, 2, 2e, 3, 3e2 or 4. The different k-values represent different bitrates provided by the optical transport units. OTUk is the highest level in the digital domain that is transported in an optical channel (OCh) in the optical domain. The OTUk comprises an overhead section (OH) and an optical data unit (ODUk) as a bit-synchronously mapped transport entity. In addition, the OTUk comprises a forward error correction (FEC) section for providing error correction capabilities. Similarly, the ODUk included in the OTUk comprises an overhead section (OH) and a transport entity termed optical payload unit (OPUk). In other words, an OPUk is mapped into a payload area of the ODUk. The OPUk itself comprises an overhead section (OH) and a payload area in which a client or LO-ODU signal is mapped. Preferably, there is a transparent client or LO-ODU signal transport within the OPUk.

In order to create an OTUk frame, a client or LO-ODU signal rate is first adapted at the OPU layer and then mapped into the payload area of the OPUk. The adaptation comprises adjusting the client or LO-ODU signal rate to the OPUk data rate. The OPUk overhead contains information to support the adaptation of the client or LO-ODU signal. The adapted OPUk is then mapped into the ODUk. The ODUk overhead contains overhead bytes that allow end-to-end supervision and tandem connection monitoring. Finally, the LO-ODUk is mapped into an HO-ODUk or the HO-ODUk is mapped into an OTUk, which provides framing as well as section monitoring and forward error correction (FEC). It is worth mentioning that OTUk signals are asynchronous within certain specified limits of typically +/−20 ppm.

In an Optical Transport Network, connections are switched on ODU level. The ODU is thus the switching entity that travels along a network path. A characteristic feature of OTN is the asynchronous operation and the bit synchronous mapping of ODUk into OTUk, which results in the fact that a received ODUk, which gets connected to another output of the network node, determines the clock, specifically the OTN frame clock of the OTUk signal at the output.

In the following, the mapping procedure for mapping a client signal, specifically a constant bitrate (CBR) client signal into an OPUk payload section, in the following also referred to as server frame or multiframe, in general transport frame, is described in closer detail. The client signal is mapped into the server frame or multiframe on the basis of data entities wherein such data entity may comprise one or more client signal bits. The data entities may comprise n-bit (e.g. n=1, 8). For a given client signal comprising a constant bitrate, the number of data entities (comprising n-bit) arriving during one server frame or server multiframe period is defined by the following formula:

$$C_n = \left( \frac{f_{client}}{n} \cdot T_{server} \right) \quad \text{(formula F1)}$$

wherein $f_{client}$ is the client bit rate or $f_{LO\text{-}ODU}$ is the LO-ODU bit rate, $T_{server}$ is the frame period of the server frame or server multiframe and $C_n$ is the number of client or LO-ODU n-bit data entities per server frame or server multiframe.

As only an integer number of n-bit data entities can be transported per server frame or multiframe, the integer value $C_n(t)$ of $C_n$ has to be used. In order to avoid any loosing of client information, any truncation of client data bits is forbidden and the non-integer portion of $C_n$ has to be considered by an appropriate sequence of data entities included in subsequent server frames. For example, if $C_n=10.25$, the non-integer portion (0.25) can be replicated by the following sequence of data entities included in subsequent server frames [10, 10, 10, 11]. In other words, the non-integer portion is distributed over multiple server frames in order to obtain the correct number of client data bit entities on the time average.

As already mentioned before, the client and server bit rate are independent. This allows specifying the server bit rate independently from the client bit rates. In addition, client clock impairments are not seen at the server clock. If the client or server bit rate changes due to client or server frequency tolerances, $C_n$ and $C_n(t)$ change accordingly. So, before mapping the client signal into the server frame, $C_n$ and $C_n(t)$ have to be determined continually and the mapping has to be formed based on the actually determined $C_n$ and $C_n(t)$.

Similarly, in order to extract the correct number of client information entities at the de-mapper, $C_n(t)$ has to be transmitted in the overhead section of the server frame or multiframe from the mapper to the de-mapper.

Figure 2:
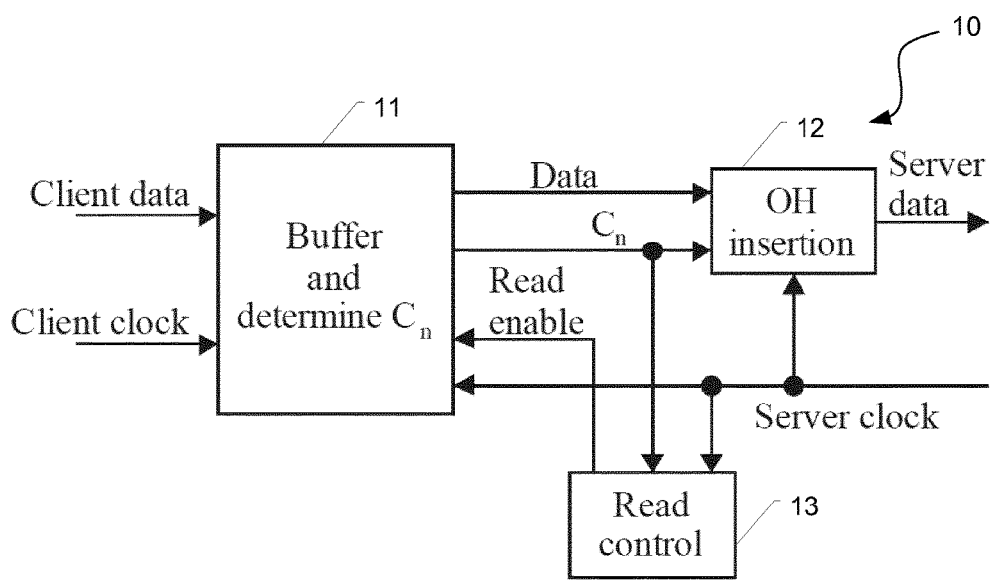
FIG. 2 shows the functionality of a mapper circuit according to ITU-T G.709, Annex D based on an example block diagram.
Figure 3:
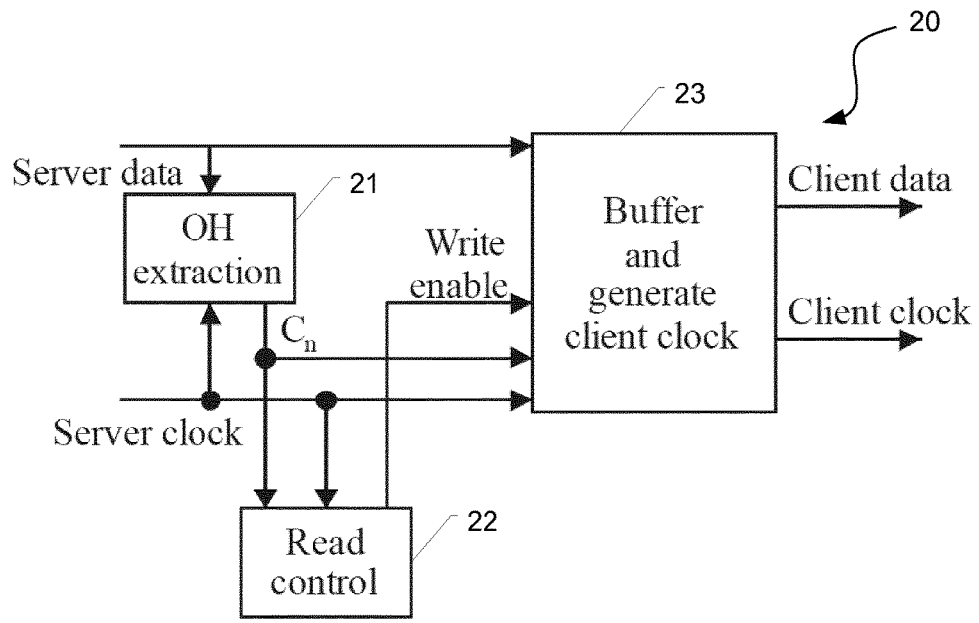
FIG. 3 shows the functionality of a de-mapper circuit according to ITU-T G.709, Annex D based on an example block diagram.

FIG. 2 shows the generic functionality of the mapper circuit 10 according to ITU-T G.709, Annex D and FIG. 3 shows the generic functionality of the de-mapper circuit 20 according to ITU-T G.709, Annex D. The mapper circuit 10 comprises a buffer 11 being adapted to receive the client data. The buffer 11 is adapted to temporarily store the client data until said data are provided to a mapping entity for including the data in a server frame or server multiframe. In addition, the buffer 11 may be adapted to determine $C_n$ based on client clock information and server frame clock (also referred to as server clock) information by using upper-mentioned formula F1. Alternatively, the mapper circuit 10 may include a further entity being adapted to determine $C_n$ based on client clock information and server frame clock information.

In addition, the mapper circuit 10 includes an overhead insertion unit 12 being adapted to insert stuffing information into the server frame or server multiframe as will be described later on, thereby providing server data in form of server frames or server multiframes. At the mapper circuit 10, $C_n(t)$ is determined based on the client and server clocks (wherein at least the client clock may be time-varying). Preferably, $C_n(t)$ may be determined continuously. The received client signal is constantly written into the buffer 11. The read-out process of buffered client data is controlled by the actual value of $C_n(t)$ using a read control entity 13. In addition, $C_n(t)$ is also included into the overhead section by means of the overhead insertion unit 12.

FIG. 3 shows a de-mapper circuit 20. The de-mapper circuit 20 comprises the reverse structure of the mapper circuit 100. The de-mapper circuit 20 comprises an overhead extraction unit 21. Said overhead extraction unit 21 may receive the server data provided by the mapper circuit 10 via the optical transport network and the server clock. The overhead extraction unit 21 is adapted to extract $C_n(t)$ out of the overhead sections of the server data. The extracted $C_n(t)$ is provided to the read control entity 22 and the buffer 23. The read control entity 22 may provide a write enable signal for enabling the buffer 23 to provide the client data at its output. The buffer may receive the server data and the server clock and may provide client data based on the server data and the $C_n(t)$-information. The client clock is also generated based on the server clock and the $C_n(t)$-information.

Depending on the data rate of the client signal, respectively, the transport capacity provided by payload area of the OPUk, the situation may occur that the payload section of the OPUk provides a higher transport capacity than needed for transmitting the client signal. In other words, the payload data rate of the OPUk is higher than the data rate of the client signal. In order to be able to transmit client signals with any data rate in an OPUk (provided that the client signal data rate is lower than the payload data rate of the OPUk), the client data rate is adapted to the payload data rate of the OPUk by using a justification procedure. The justification procedure uses a sigma/delta data/stuff mapping for adapting the client data rate to the payload data rate. By using said sigma/delta data/stuff mapping, the client data rate is artificially increased by adding stuff bits or stuff data entities (in general stuff information) to the client data. The amount of stuff information is chosen such that the payload section of the OPUk is totally filled with client data and said stuff information.

Figure 4:
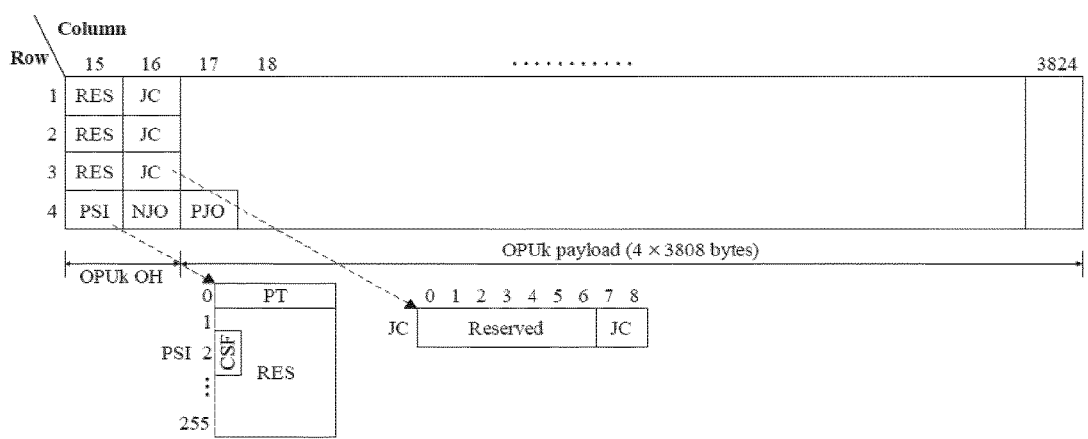
FIG. 4 shows the example frame structure of the OPUk frame according to ITU-T G.709, chapter 17.

FIG. 4 shows a section of the frame structure of the OPUk frame providing information for said justification procedure according to ITU-T G.709, chapter 17. The overhead section of the OPUk frame comprises three justification control (JC) bytes in rows 1 to 3 of column 16, a negative justification opportunity (NJO) byte in row 4, column 16 and a positive justification opportunity (PJO) byte in row 4, column 17, said bytes providing information regarding the performed justifications. The mapping process performed by the mapper circuit 100 generates JC, NJO and PJO bytes according to the tables 17-1 and 17-2 shown in ITU-T G.709, chapter 17 and the de-mapping process performed by a de-mapper circuit 200 at the receiver side interprets the JC, NJO and PJO bytes according to table 17-3. Thereby, the artificially increased client data rate is decreased by removing stuff information thereby obtaining the original client signal out of the OPUk payload section.

Figure 5:
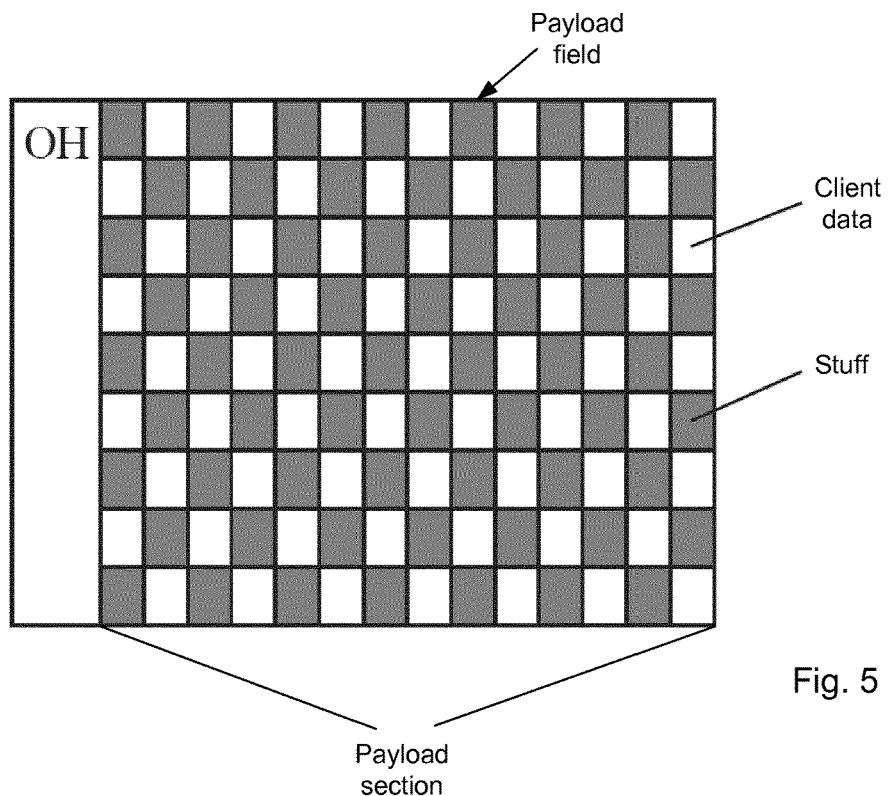
FIG. 5 schematically illustrates sigma/delta data/stuff mapping according to ITU-T G.709, Annex D.

FIG. 5 shows a schematic representation of an OPUk server frame or multiframe with a payload section including data and stuff information obtained by upper-mentioned sigma/delta data/stuff mapping. Depending on the client signal bit rate and the bit rate which can be transported by the server frames, the (time dependent) number (integer number) of client data entities $C_n(t)$ to be transmitted in a single server frame is determined. According to said determined number of client data entities $C_n(t)$, client data entities are mapped into the server frame or server multiframe using sigma/delta data/stuff mapping.

FIG. 5 schematically illustrates sigma/delta data/stuff mapping according to ITU-T G.709, Annex D. The server frame or multiframe includes in its payload section a plurality of payload fields j, wherein j=1 . . . $P_{server}$.

According to the sigma/delta data/stuff mapping carries payload field j client data if the following inequality is fulfilled:

$$(j \cdot C_n(t)) \bmod P_{server} < C_n(t). \qquad \text{(formula F2)}$$

The payload field j may carry stuff if the following inequality is fulfilled:

$$(j \cdot C_n(t)) \bmod P_{server} \geq C_n(t). \qquad \text{(formula F3)}$$

In other words, a number of $C_n(t)$ client data entities have to be distributed over $P_{server}$ payload field locations. In case that $P_{server}$ is greater than $C_n(t)$, there is a spacing between two payload fields carrying stuff.

Current developments focus on the transport of a reference clock along an OTU link. Another discussion is to transport Precision time protocol (PTP) over OTN.

When synchronizing the OTN transport clocks, problems may arise if the frequencies of synchronous services transported in the ODU payload area will be close to integer fractions of the transport rates, i.e. the bitrate of the client signal (in the above-mentioned embodiment the frequency of the reference clock signal) is close to an integer fraction of the bitrate being able to be transported within the server frame. Said proximity of data rates leads to systematic justification patterns with mostly stable justification states and few infrequent extra frequency justification actions for infrequent phase adjustments. This happens for both mapping-schemes used for such client configurations for asynchronous mapping: Asynchronous Mapping Procedure (AMP) as well as generic mapping procedure (GMP).

Also in Appendix VII of ITU-T recommendation G.8251, the control of jitter and wander within the optical transport network is already described that in the case of small offsets of OTN server and client clock, jitter components may be generated which pass all filters as defined for server to client de-multiplexers. As a result of passing such filters in network scenario with such small frequency differences, an accumulation of such justification events appear with higher probability.

In order to overcome the problem of low frequency jitter and/or short term wander passing the clock recovery filter in the optical receiver, it is proposed to artificially generate dithering of value of $C_n$, i.e. a dithering of the mean number of client data entities received during a transport frame period $T_{server}$. For example, a dithering of the phase of the client signal mapped into the transport frame may be generated by alternating adding and subtracting a number of bits, (for example m/2-bit, wherein m is the number of bits included in a data entity mapped into the transport frame) per server frame or multi-frame, respectively, at the input for this mapping from the signaled true $C_n$ as used for the buffer control in the mapper for generating the read control out of the buffer depicted in Figure D.1 of G.709 Annex. By, for instance, subtracting from the determined $C_n$ (formula F1) the value of m/2 bits at every odd and adding m/2 bits at every even server frame/multi-frame, a varying phase information of the client signal oscillating around the nominal value is created in the case the server clock is synchronized to a G.813, G.8262, G.812 or G.811 clock. Such phase oscillations, with the frequency of the client phase in relation to the server clock can easily be filtered by the client clock recovery process and the recovery will average the client phase to the average thereby avoiding infrequent few phase steps and its correlated possible accumulation that will generate low frequency jitter or short term wander passing the clock recovery filter.

In order to provide enough buffer space, the buffer 11 depth of the mapper circuit 10 and also the buffer 21 of the de-mapper circuit 20 for the stored client data at the mapping/de-mapping GMP processor as depicted in Figure D.1 of G.709 Annex needs to be increased to be able to insert at least 2 extra 2*m-bit data entries into a server frame to prevent buffer under/over-run at the mapper/de-mapper.

Figure 6:
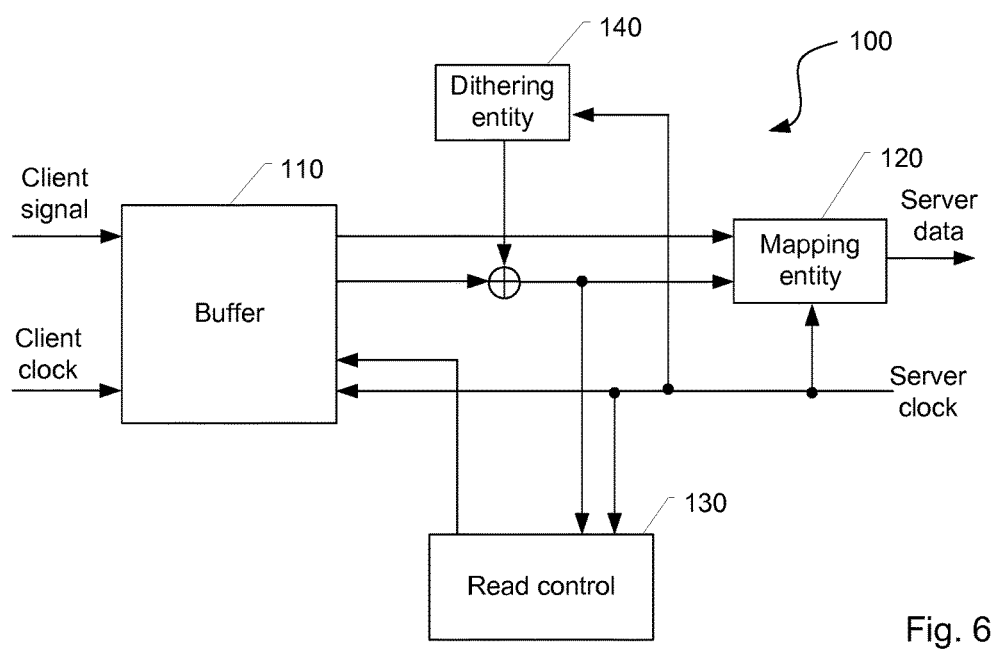
FIG. 6 shows the functionality of a mapper circuit including a dithering entity based on an example block diagram.

FIG. 6 shows a mapper circuit 100 included in an optical transmitter of an optical transmission system being adapted to provide upper-mentioned transmitted data rate dithering in closer detail. The mapper circuit 100 comprises a buffer 110. Said buffer 110 receives the client signal for buffering the client signal. The client signal is a digital signal including a plurality of client data entities, each client data entity comprising n client data bits. In addition, the mapper circuit 100 may comprise a processing entity (not shown in FIG. 6) which is adapted to determine the number of client data entities received during a transport frame period (e.g. based on formula F1). Thereby, a mean number of received client or LO-ODU data entities is determined. In the following, said mean number may be referred to as $C_n$. In case of a constant bitrate client or LO-ODU signal, the mean number of received client $C_n$ (also referred to as LO-ODU data entities) may comprise a fixed value. The processing entity for determining said the mean number of received client or LO-ODU data entities $C_n$ may be included in the buffer 110 or may be a separate entity.

Said mean number of received client or LO-ODU data entities $C_n$ comprises a mean number of client or LO-ODU data bits. With n being the number of bits being included in the client or LO-ODU data entity, the mean number of client or LO-ODU data bits is n*$C_n$. In order to generate a dithering of the client data mapped into subsequent transport frames, the mapper circuit 100 comprises a dithering entity 140. Said dithering entity 140 may receive the server clock, i.e. the clock based on which the transport frames are transmitted via the optical transport network.

The dithering entity 140 is adapted to modify the mean number of received client data entities $C_n$ in order to achieve a variation of client signal data transmitted in subsequent transport frames. More in detail, the mean number of received client data entities $C_n$, respectively, in the present case the modified or varied number of received client data entities, in the following referred to as $C_{n+/-}$, is used for controlling the read out of client data out of the buffer 110 as well as the mapping of said client data into the transport frames. For example, $C_{n+/-}$ is provided to the read control entity 130 which is adapted to provide a read enable signal to the buffer 110 based on $C_{n+/-}$ value. The read out of client data is controlled based on said read enable signal. $C_{n+/-}$ value is in the following also referred to as data entity indicator.

Similarly, the modified or varied number of received client data entities $C_{n+/-}$ is also provided to the mapping entity 120. Said mapping entity maps the client data into the transport frames based on said modified or varied number of received client data entities $C_{n+/-}$, i.e. depending on the value of $C_{n+/-}$, a certain amount of client data bits are mapped into the transport frame.

Said dithering of client data mapped into the transport frame may be done in a deterministic way or a non-deterministic, stochastic way. In other words, the mean number of received client data entities $C_n$ provided by the processing entity may be varied by adding/subtracting a fixed number of client data bits to/from the mean number of client data bits included in said mean number of received client data entities $C_n$ or changing $C_n$ based on a certain fixed variation pattern.

For example, said modified or varied number of received client data entities $C_{n+/-}$ may be obtained by an alternating adding/subtracting of a certain amount of client data bits. The transport or HO-ODU frame (server frame, multiframe) may include $C_m$ data entities (or data blocks) comprising m bytes, wherein m is an integer value. Preferably, the $C_n$ is modified by adding/subtracting m/2 client or LO-ODU data bytes. Thereby, a certain transport or HO-ODU frame may comprise m/2 less bytes of the client or LO-ODU data signal and the subsequent transport or HO-ODU frame may comprise m/2 more bytes of the client or LO-ODU data signal, both compared to the situation without performing dithering of client or LO-ODU data. In other words, subsequent transport or HO-ODU frames may comprise a different amount of client or LO-ODU data, the difference being one m-byte data block. Thereby, the amount of client or LO-ODU data transmitted in consecutive transport or HO-ODU frames dithers around the mean number of received client or LO-ODU data entities $C_n$, said dithering being easily filtered out in the client or LO-ODU clock recovery process at the receiver side. The frequency of said dithering, respectively, the phase oscillations caused by said dithering is $$f_{osc} = \frac{1}{2 * T_{Server}};$$

with $T_{Server}$ being the frame period of a transport or HO-ODU frame/multiframe.

The modified or varied number of received client data entities $C_{n+/-}$ may be inserted into the overhead section of the transport frame in order to transmit $C_{n+/-}$ to the receiver side and extract the client data out of the transport frame based on the received value of $C_{n+/-}$, respectively, recover the clock of the client signal based on the received value of $C_{n+/-}$.

Figure 7:
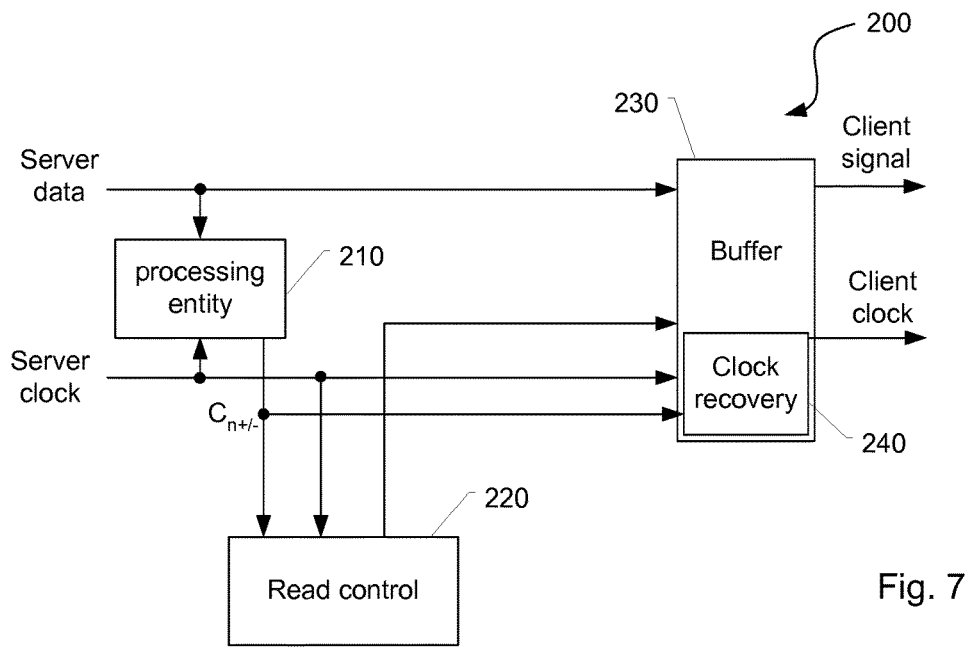
FIG. 7 shows the functionality of a de-mapper circuit being adapted to interact with a mapper circuit according to FIG. 6 based on an example block diagram.

FIG. 7 shows a demapper circuit 200 included in an optical receiver. The demapper circuit 200 may comprise a processing entity 210 being adapted to extract $C_{n+/-}$ out of the overhead section of the transport frame of the server data and provide the extracted value of $C_{n+/-}$ to the read control entity 220. The value $C_{n+/-}$ is in the following also referred to as data entity indicator. The read control entity 220 may further receive the server clock and provide a control signal based on the server clock and the extracted value of $C_{n+/-}$. The payload data included in the server data (data including the client data) may be provided to a buffer 230. The buffer 230 receives the control signal provided by the read control entity 220. The read out of client data out of the buffer 230 is performed based on said control signal. Furthermore, the demapper circuit 200 comprises a clock recovery entity 240, said clock recovery entity 240 receiving the extracted value of $C_{n+/-}$ and may recover the client signal clock based on $C_{n+/-}$. For example, the clock recovery entity 240 may comprise a phase locked loop circuit and a clock recovery filter for recovering the client signal clock. Due to the dithering of $C_{n+/-}$, infrequent phase steps resulting from infrequent steps of the data rate of the server data (i.e. infrequent steps of the data rate of the client data transmitted within the transport frames) are avoided which may result in low frequency jitter or short term wander passing the clock recovery filter. Thereby, the transmission quality of high precision synchronous signals, specifically, reference clock signals via an optical transport network is improved.

Figure 8:
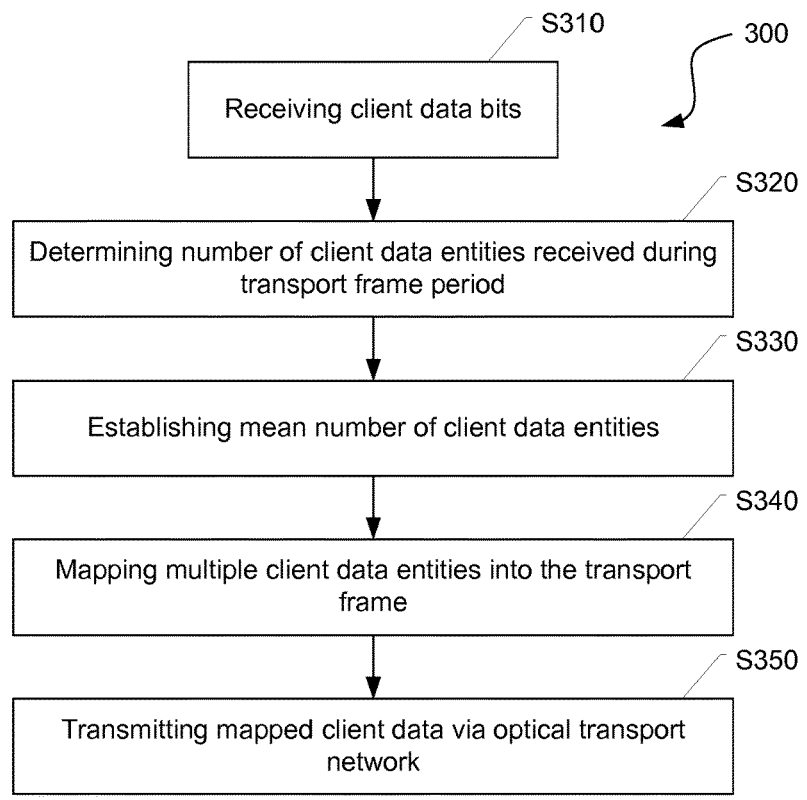
FIG. 8 illustrates a method for transmitting an optical signal including a plurality of transport frames.

FIG. 8 shows a diagram indicating the steps of a method 300 for transmitting client data via an optical transmission path of an optical transport network. As mentioned above, the optical transport network uses transport frames comprising a transport frame period for transmitting client data.

First, multiple client entities comprising multiple client data bits are received (S310). After receiving said multiple client data bits, the number of client data entities received during a transport frame period is determined (S320) and a mean number of client data entities to be included in a transport frame is established (S330), said mean number of client data entities corresponding to a mean number of client data bits. Furthermore, multiple client data entities are mapped into the transport frame (S340) thereby alternately adding and subtracting an amount of client data bits to/from said mean number of client data bits for at least two consecutive transport frames. Finally, the transport frames comprising said client data are transmitted via the optical transport network (S350).

Figure 9:
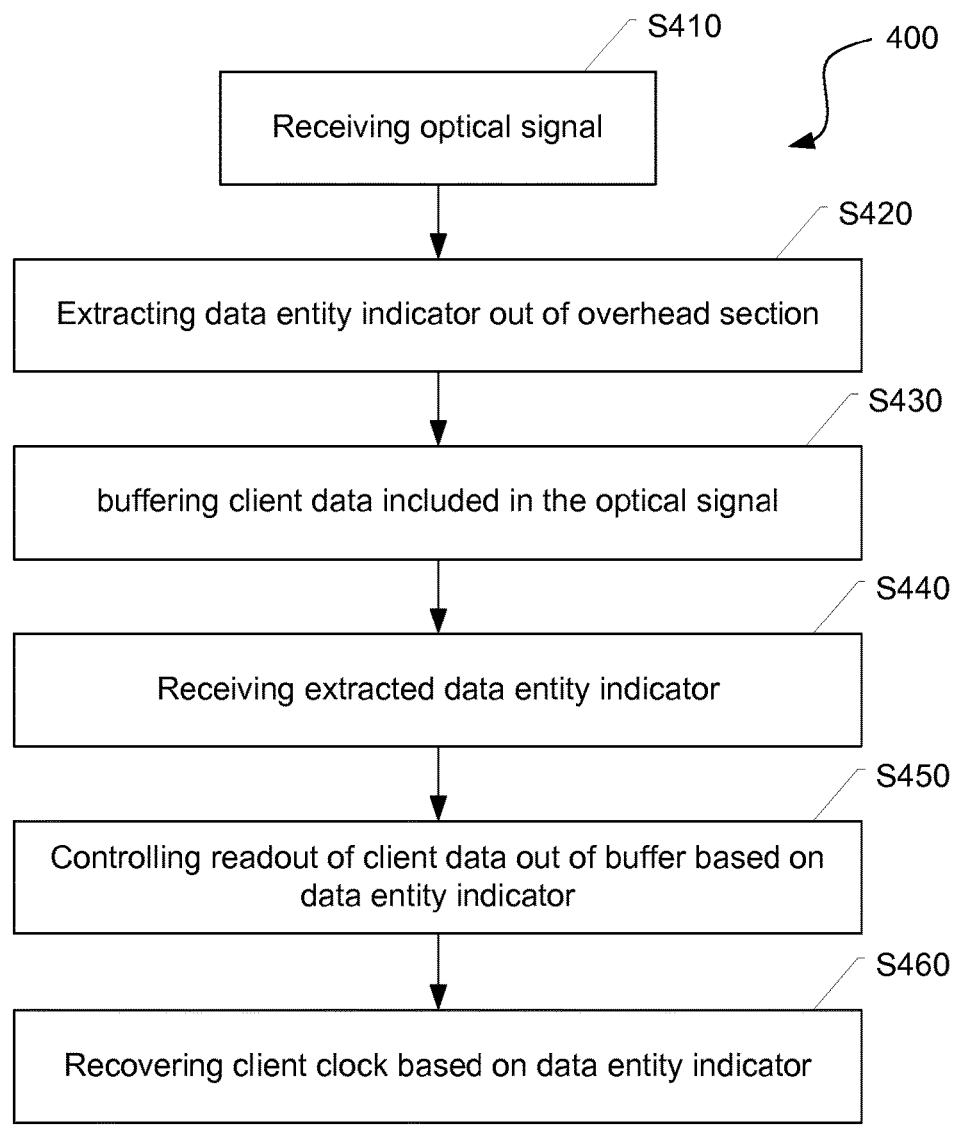
FIG. 9 illustrates a method for receiving an optical signal including a plurality of transport frames.

FIG. 9 shows method steps of a corresponding method 400 for receiving an optical signal comprising transport frames including a client signal.

First, the optical signal is received by the optical receiver (S410). After receiving the optical signal, a data entity indicator is extracted out of an overhead section of the transport frame (S420), said data entity indicator specifying an amount of data entities included in the transport frame. Thereby, the value of the data entity indicator associated with consecutive transport frames continuously changes. In addition, client data included in the optical signal are buffered in a buffer entity (S430). The extracted data entity indicator is received at the control entity (S440) and the readout of client data out of the buffer is controlled based on the continuously changing data entity indicator (S450).

Finally, a client clock signal is recovered based on the continuously changing value of the data entity indicator (S460).

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, the explicit use of the term "processor" or "computer" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random-access memory (RAM), and non-volatile storage. Other hardware, conventional and/or custom, may also be included.

The invention claimed is:

1. A method for transmitting client data included in a client signal via an optical transmission path of an optical transport network, the optical transport network using transport frames comprising a transport frame period for transmitting client data, the method comprising the steps of:

receiving multiple client data bits during a transport frame period;

determining a number of client data entities corresponding to the received multiple client data bits to establish a mean number of client data entities to be included in a transport frame, the mean number of the client data entities corresponding to a mean number of client data bits;

mapping multiple client data entities into the transport frame, wherein the mapping comprises alternately adding and subtracting an amount of client data bits to/from the mean number of client data bits for at least two consecutive transport frames; and transmitting the transport frames comprising the client data via the optical transport network.

2. The method according to claim 1, wherein the client data to be included in consecutive transport frames is changed by adding/subtracting a fixed number of client data bits to/from the mean number of client data bits.

3. The method according to claim 1, wherein the number of client data bits mapped into consecutive transport frames is periodically changed.

4. The method according to claim 3, wherein the mapping of the client data entities is performed such that the number of the client data bits to be included in a transport frame is permanently varied.

5. The method according to claim 1, wherein the number of the client data bits mapped into consecutive transport frames is changed in a non-deterministic, stochastic way.

6. The method according to claim 1, wherein the mean number of the client data entities to be included in the transport frame is determined based on a clock rate of the client signal, the transport frame period and the number of the client data bits included in a transport frame.

7. The method according to claim 1, wherein the client data are buffered within a buffer before mapping the client data into the transport frame.

8. The method according to claim 7, wherein the client data continuously written into the buffer and read out of the client data out of the buffer is controlled based on the mean number of the client data entities.

9. The method according to claim 7, wherein the mean number of the client data entities is varied to vary the read out of the client data out of the buffer.

10. The method according to claim 9, wherein the varied number of the client data entities is inserted in an overhead section of the transport frame.

11. The method according to claim 10, wherein at a receiver side, the client data included in the transport frame are buffered within a buffer.

12. The method according to claim 11, wherein the varied number of the client data entities is extracted out of the overhead section of the transport frame to control the readout of data out of the buffer at the receiver side.

13. An optical transmitter for transmitting client data included in a client signal via an optical transmission path of an optical transport network, the optical transport network using transport frames comprising a transport frame period for transmitting client data, the optical transmitter comprising:

an interface adapted to receive multiple client data bits during a transport frame period;

a processing entity adapted to determine a number of client data entities comprising the multiple client data bits to establish a mean number of client data entities to be included in a transport frame, the mean number of client data entities comprising a mean number of client data bits;

a mapping entity adapted to map multiple client data entities into the transport frame, wherein the mapping entity is further adapted to vary an amount of client data to be transmitted in consecutive transport frames by adding or subtracting an amount of client data bits to/from the mean number of client data bits for at least two consecutive transport frames; and an optical transmission entity adapted to transmit an optical signal comprising transport frames including the client data via the optical transport network.

14. An optical receiver for receiving an optical signal on an optical transmission path of an optical transport network, the optical transport network using transport frames for transmitting client data, the optical receiver being adapted to provide client data and a client clock signal, the optical receiver comprising:

an interface adapted to receive the optical signal that comprises multiple client data entities mapped into a transport frame by alternately adding and subtracting an amount of client data bits to/from a mean number of client data bits for at least two consecutive transport frames;

a processing entity adapted to extract a data entity indicator out of an overhead section of the transport frame, the data entity indicator specifying an amount of data entities included in the transport frame, wherein a value of the data entity indicator associated with consecutive transport frames continuously changes;

a buffer adapted to buffer data included in the optical signal;

a control entity adapted to receive the extracted data entity indicator and adapted to control a readout of client data out of the buffer based on the continuously changing data entity indicator; and a clock recovery unit adapted to provide the client clock signal based on the continuously changing value of the data entity indicator.

15. A method for receiving an optical signal on an optical transmission path of an optical transport network, the optical transport network using transport frames for transmitting client data, the method comprising the steps of:

receiving the optical signal that comprises multiple client data entities mapped into a transport frame by alternately adding and subtracting an amount of client data bits to/from a mean number of client data bits for at least two consecutive transport frames;

extracting a data entity indicator out of an overhead section of the transport frame, the data entity indicator specifying an amount of data entities included in the transport frame, wherein a value of the data entity indicator associated with consecutive transport frames continuously changes;

buffering client data included in the optical signal;

receiving the extracted data entity indicator at a control entity and controlling a readout of client data out of the buffer based on the continuously changing data entity indicator; and recovering a client clock signal based on the continuously changing value of the data entity indicator.

16. The method according to claim 1, wherein a precision time protocol is transported over the optical transport network to synchronize transport clocks.

* * * * *